METHOD OF DETERMINING DOWNHOLE OCCURENCES IN WELL DRILLING USING ROTARY TORQUE OSCILLATION MEASUREMENTS

Original Filed Dec. 28, 1970

INVENTORS
ALBERT L. VITTER, JR.
HUGH G. McDONALD
BY Edward J. Keeling
Charles J. Gibeaux
ATTORNEYS United States Patent Re. 28,436
Reissued June 3, 1975

28,436

METHOD OF DETERMINING DOWNHHOLE OCCURRENCES IN WELL DRILLING USING ROTARY TORQUE OSCILLATION MEASUREMENTS

Albert L. Vitter, Jr., New Orleans, and Hugh G. McDonald, Monroe, La., assignors to Chevron Research Company, San Francisco, Calif.

Original No. 3,703,096, dated Nov. 21, 1972, Ser. No. 101,739, Dec. 28, 1970. Application for reissue July 23, 1973, Ser. No. 381,956

Int. Cl. E21b *47/00*

U.S. Cl. 73—151 18 Claims

Matter enclosed in heavy brackets [ ] appears in the original patent but forms no part of this reissue specification; matter printed in italics indicates the additions made by reissue.

ABSTRACT OF THE DISCLOSURE

Method and apparatus are used to detect and measure oscillation of the rotary torque generated while well drilling, particularly oscillations of a frequency near the expected frequency of torsional oscillation of the drill string. The method and apparatus are particularly useful in indicating bit damage.

FIELD OF THE INVENTION

The present invention is directed to rotary well drilling and, more specifically, the present invention is directed to obtaining, at the surface, indications of drill bit damage utilizing rotary torque oscillation measurements.

BACKGROUND OF THE INVENTION

Wells are drilled for oil utilizing a drill bit connected to the surface by a string of drill pipe. The drill pipe is rotated to cause the bit to rotate and cuttings are circulated up the well annulus by means of a circulating fluid. As the drill string is rotated, the drill bit tends to wear down and eventually fail. In deep hole drilling (e.g. 10,000 feet) balance must be made between operating the drill bit until a failure occurs which necessitates a fishing job, and pulling the bit prematurely from the well, i.e., while there is still useful life in the bit, because in deep hole drilling, half a day, or more, may be required to pull the bit from the hole, place a new bit on the drill string, and run it back into the hole. It is, therefore, desirable to get maximum use out of each drill bit. Heretofore no satisfactory method has been found to determine when the drill bit is damaged, and should be pulled.

One form of rotary drilling utilizes roller cones which are connected to the bit body and which are bearing mounted so as to roll on the drilled rock face when the drill bit is rotated. Usually a roller cone bit has three or four roller cones. As noted above, it is desirable to operate these bits to a point just short of complete failure, i.e., it is generally desirable to operate the bit just short of the point where the roller cones become detached from the bit body. In operation, the bearings of the roller cones tend to freeze after a period of use. Even then, the bits with the frozen roller cones may still be operated for a short additional period. However, if the frozen bits are operated for too long a time, the bushings are likely to be destroyed and the cones will fall free of the bit body when the drill pipe is pulled. If this occurs, a "fishing job" must be performed to remove the roller cones from the hole before further drilling may proceed. The fishing job requires a complete roundtrip with a drill string having special fishing apparatus connected to its lower end. This opeation is time-consuming and expensive and is to be avoided, if all possible.

Several types of methods have been tried in the past to determine when it is desirable to pull a bit in order to place a new bit on the drill string. One of the most promising methods involved embedding radioactive tracers in the grease in the roller cones of a bit. The tracers are released into the drilling fluid stream when the roller cones fail. The tracers are then detected by monitoring apparatus at the surface. This method, however, is somewhat inadequate in that the travel time of the mud up the annulus may be as much as an hour and, therefore, much additional damage can be done to the bit before anything is detected at the surface. The nearest approach to the method of the present invention has perhaps been the observation of drill pipe torque changes at the surface, but these were changes in the average value of the torque as observed on a meter in front of the driller or on a drilling recorder. (See e.g., the advertisement of Technical Oil Tool Corporation, p. 4,571 of the Composite Catalog of Oil Field Equipment and Services. 1970–71 Edition. Published by World Oil, Houston, Tex. Also see p. 3,237 of same publication for an advertisement ad of Martin-Decker Corp. on the same subject.) Changes in the average torque can result from many causes, the commonest being a change in the formation being drilled, and so they are not a reliable indication of bit damage. There is still need, therefore, for a reliable method of detecting bit damage.

BRIEF DESCRIPTION OF THE INVENTION

The present invention provides a method of detecting bit damage during rotary drilling by utilizing, as an indication of such damage, very particular oscillatory changes in rotary torque produced while drilling. In accordance with the invention, the rotary torque produced during rotary drilling is monitored for characteristic oscillations of a frequency in the neighborhood of the expected frequency of torsional oscillation of the drill string. These oscillations usually have a frequency significantly different from the fundamental frequency of rotation of the rotary drill string and the harmonics of that frequency, so that they may be unambiguously detected. The expected period of torsional oscillation of the drill string in most drilling operations of interest is of the order of 3 to 12 seconds. In accordance with the present invention the method of determining bit damage in rotary drilling includes rotating a drill string having a bit attached thereto in a hole and monitoring the rotary torque for characteristic oscillations, said oscillations having a frequency not more than twice and not less than half the expected frequency of torsional oscillation of the drill string and said oscillations having an amplitude substantially in excess of the amplitude of any oscillations produced by rotation of an undamaged bit.

The preferred apparatus of the present invention includes a drill string and electric drive means for rotating the drill string. A shunt is connected to the electric drive means for producing a signal proportional to the current utilized by the electric drive means during rotation of the drill string. A filter means is connected to the shunt. The filter is selected to suppress relatively high frequency signals having a period near to the rotary table period and to suppress relatively low frequency signals of less than one twenty-fourth cycles per second. A recording means is connected to the shunt through the filter for recording the signal passed by the filter.

In a preferred embodiment of the present invention rotary torque is measured by determining the current required to operate the electric motor which rotates the drill string. A shunt is provided between the generator and the rotary drive electric motor from which a continuous measurement of current is made. The signal obtained is filtered through an appropriate band pass filter selected to pass frequencies depending, as detailed later, on the dimensions and masses of the various portions of the drill string. The signal is recorded on a suitable strip chart recorder. It has been found that significant oscillations in the passed signal are indicative of bit damage. These oscillations may be observed on the strip chart.

OBJECTS OF THE INVENTION

A particular object of the present invention is to provide a driller with a method of determining bit damage utilizing oscillatory changes in rotary torque which characteristically occur as a result of such damage. Further objects and advantages of the present invention will become apparent from the following detailed description read in view of the accompanying drawing.

DETAILED DESCRIPTION OF THE PREFERRED EMBODIMENT

Figures 1, 2:
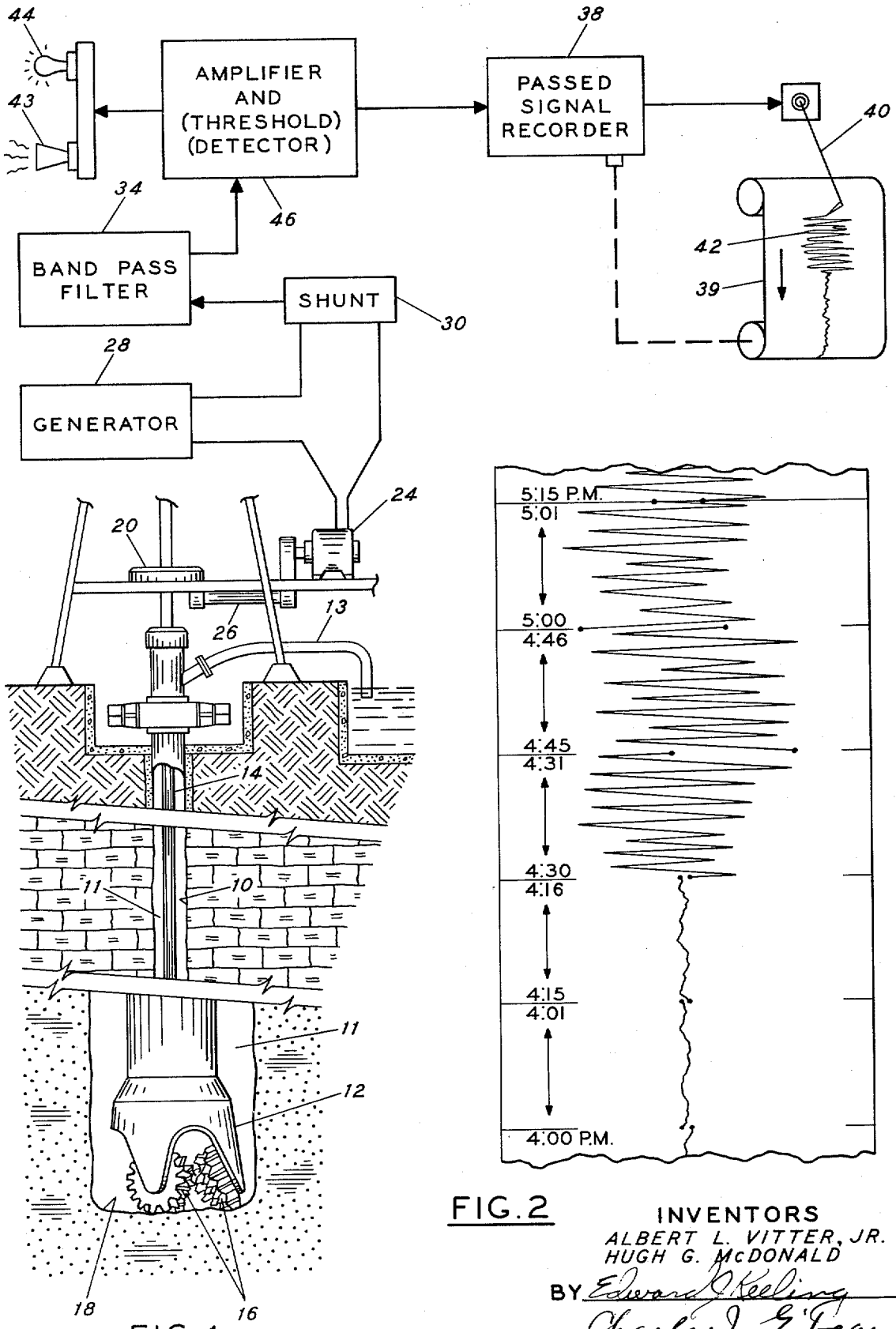
FIG. 1 is a schematic view and illustrates a preferred embodiment of apparatus assembled in accordance with the present invention.
FIG. 2 is a facsimile of a portion of a strip chart recording revised for clarity and illustrates oscillations in rotary torque recorded against time and is typical of records produced in accordance with the present invention.

Refer now to FIG. 1 where a schematic illustration of the preferred embodiment of apparatus assembled in accordance with the present invention is shown. A well 10 is being drilled by means of rotating bit 12 with drill string 14. Bit 12 has rotary cones 16 which rotate against the drilled rock face 18 as the bit is rotated. The rotary cones 16 have teeth which engages the rock face 18 and break it into chips. These chips are carried to the surface by means of drilling mud which comes down through drill string 14 and circulates back up annulus 11 and out the overflow pipe 13. The drill pipe is rotated at the surface by means of rotary table 20. The topmost portion of the pipe, the so-called kelly, is square in external cross section so that it may be gripped for rotation, but may still move freely through the rotary table vertically. The rotary table 20 is rotated by electric motor 24 through appropriate linkage 26. Power for the electric motor is supplied through suitable circuitry by generator 28.

In accordance with the present invention it has been found that as bearings of the drill bit cones 16 begin to fail, characteristic oscillations are produced in the rotary torque of drill string 14. These oscillations have a period longer than the fundamental period of rotation of the rotary table 20 and approximately equal to the expected period of torsional oscillation of the drill string. In order to more fully understand the present invention a description is now given of a method of calculating the expected period of torsional oscillation of a drill string. The description is based upon readily available material in a well-known textbook, "Vibration Problems in Engineering" by S. Timoshenko, 3rd edition, Van Nostrand Company, 1955.

As discussed by Timoshenko on pages 9 and 10, the periods of torsional oscillation in bodies such as a drill string are given by equations of the type of Equation (1) (Timoshenko's Equation (9), page 10):

$$\tau = 2\pi\ I/K \qquad (1)$$

$\tau$=the period of torsional oscillation
I=an effective moment of inertia
K=an effective spring constant (torque per radian of twist)

For a simple rigid disk, Timoshenko calculates the moment of inertia from Equation (2) (an unnumbered equation on Timoshenko's page 11):

$$I = WD^2/8g \qquad (2)$$

W=weight of the disk
D=diameter of the disk
g=gravitational acceleration

For the effective spring constant of a simple solid shaft Timoshenko gives Equation (3) (Timoshenko's Equation (a), page 10):

$$K = (\pi d^4 G/32L) \qquad (3)$$

d=diameter of shaft
L=length of shaft
G=the shear modulus

The drill string of interest here comprises a long, relatively flexible drill pipe, and a set of relatively stiff drill collars attached to this drill pipe above the bit. Thus two complications must be introduced into the simple Timoshenko formulas. These complications are introduced by methods which Timoshenko has outlined or indicated in his text. Equation (2) is readily converted to an equation for a hollow cylinder instead of a solid disk in the following manner: First, Equation (2) is written in an expanded form in terms of a specific weight, w, and disk height, h:

$$I = (wh\pi D^2/4)\ (D^2/8g) \qquad (4)$$

Then for a hollow cylinder of two different diameters, D and d:

$$I = (1/8g)\ (wh\pi/4)\ (D^4 - d^4) \qquad (5)$$

But $D^4 - d^4 = (D^2 - d^2)\ (D^2 = d^2)$
So $I = (1/8\ g)\ (wh\pi/4)\ (D^2 - d^2)$
or $$I = (W(D^2 + d^2)/8g \qquad (6)$$

where in Equation (6), W is now the weight of the hollow cylinder.

Equation (6) is the basic formula for computing the moments of inertia of the parts of the drill string in the problem of interest, but for the upper part of the string, the drill pipe itself, the effective moment of inertia is less than that indicated by Equation (6) because the upper part of the drill pipe is relatively stationary during the oscillation. The drill pipe itself participates actively in the oscillation only toward its bottom. Timoshenko shows in his pages 29 and 30 how, with the use of Rayleigh's method, one may calculate the effective moment of inertia of a simple shaft undergoing this type of motion. His analysis shows that, in such a circumstance, an expression of the type of Equation (6) should be multiplied by a factor of one-third.

For the system concerned here it is convenient then to write down an equation of the type of Equation (6) involving three terms, one for the drill pipe, and one for each of two sections of drill collar, denoted respectively by the subscripts 1, 2 and 3:

$$I = \frac{1}{8g}\left[\frac{W_1}{3}(D_1^2 + d_1^2) + W_2(D_2^2 + d_2^2) + W_3(D_3^2 + d_3^2)\right] \qquad (7)$$

The remaining necessity at this point is to formulate an expression for the effective spring constant to insert in Equation (1). Equation (3) may be readily converted to an equation for a hollow cylinder of two different diameters, D and d:

$$k = \frac{\pi G}{32L}(D^4 - d^4) \qquad (4)$$

but the system concerned has three different lengths, of different elastic properties. Timoshenko show on page 11 how a composite solid shaft, composed of two lengths of diffrent diameters, acts as if it were a shaft of the single smaller diameter but of an "equivalent" length less than the actual composite length. The stiffer, part of larger diameter acts as if it were shorter than its actual length. By reasoning identical to that of Timoshenko, Equation (8) may be converted to Equation (9):

$$Sok = \frac{\pi G(D_1^4 - d_1^4)}{32\left[L_1 + L_2\frac{(D_1^4 - d_1^4)}{(D_2^4 d_2^4)} + L_3\frac{(D_1^4 - d_1^4)}{(D_3^4 d_3^4)}\right]} \qquad (9)$$

in which the subscripts have the same meanings as in Equation (7) and the denominator represents an effective length composed of the actual length of the drill pipe and two "equivalent" lengths of drill collar shorter than their actual length by factors which account for their relative stiffnesses.

The two Equations (7) and (9) give the quantities that are to be inserted in Equation (1) which, in turn, will give the period of torsional oscillation that is desired to be calculated.

EXAMPLE 1

Set out below is an example calculation of the natural torsional period of a typical drill string which comprises 15,600 feet of 4½-inch drill pipe, 1,200 feet of 4½-inch drill collars and 200 feet of 6½-inch drill collars:

1. 4½-inch Drill Pipe (I.D.=3.826 inch) weighing 16.6 lb./ft. Length of 15,600 feet×16.6 lb.ft.=259,000 lb.

$D_1=4.5''$ $\quad D_1^2+d_1^2=34.85$ in.$^2$
$d_1=3.826''$ $\quad D_1^4=410$
$W_1=259{,}000\#$ $\quad d_1^4=213$
$D_1^2=20.25$ $\quad D_1^4-d_1^4=197$ in.$^4$
$d_1^2=14.60$ 2. 4½-inch Flexweight Drill Collars (I.D.=2.76 inch) weighing 32 lb./ft. Length of 1,200 feet×32 lb./ft.=38,500 lb.

$D_2=4.5''$ $\quad D_2^2-d_2^2=27.85$ in.$^2$
$d_2=2.76''$ $\quad D_2^4=410$
$W_2=38{,}500\#$ $\quad d_2^4=57.8$
$D_2^2=20.25$ $\quad D_2^4-d_2^4=352.2$ in.$^4$
$d_2^2=7.60$ 3. 6½-inch Drill Collars (I.D.=3.0 inch) weighing 80 lb./ft. Length of 200 feet×80 lb./ft.=16,000 lb.

$D_3=6.5''$ $\quad D_3^2-d_3^2=51.25$ in.$^2$
$d_3=3.0''$ $\quad D_3^4=1780$
$W_3=16{,}000\#$ $\quad d_3^4=81$
$D_3^2=42.25$ $\quad D_3^4-d_3^4=1699$ in.$^4$
$d_3^2=9.00$ $$I=\frac{1}{8g}\left[\frac{1}{3}W_1(D_1^2+d_1^2)+W_2(D_2^2+d_2^2)+W_3(D_3^2+d_3^2)\right]$$

$$I=\frac{1}{12''/\text{ft.}\times 8\times 32\text{ ft./sec.}^2}\left[\left(\frac{1}{3}\times 259{,}000\#\times 34.85\text{ in.}^2\right)+(38{,}500\#\times 27.85\text{ in.}^2)+(16{,}000\#\times 51.25\text{ in.}^2)\right]$$

$$I=\frac{4.920\times 10^6\#/\text{in.}^2}{3072\text{ in./sec.}^2}=1600\#\text{ in. sec.}^2$$

$$k=\frac{\pi G}{32}\left[\frac{D_1^4-d_1^4}{L_1+\frac{D_1^4-d_1^4}{D_2^4-d_2^4}L_2+\frac{D_1^4-d_1^4}{D_3^4-d_3^4}L_3}\right]$$

$$k=\frac{\pi}{32}\times 12\times 10^6\#/\text{in.}^2\times\left[\frac{197\text{ in.}^4}{(15{,}600\times 12)\text{ in.}+\left(1200\times 12\text{ in.}\times\frac{197}{352.2}\right)+\left(200\times 12\times\frac{197}{1699}\right)}\right]$$

$$k=1.19\times 10^6\#/\text{in.}^2\left(\frac{197\text{ in.}^4}{196{,}000\text{ in.}}\right)=1195\#\text{ in.}$$

$$\tau=2\pi\sqrt{\frac{I}{k}}=2\pi\sqrt{\frac{1600\#\text{ in. sec.}^2}{1195\text{ in.}}}=7.3\text{ seconds}$$

The discussion thus far considers the drill string in effect rotating in a vacuum or a fluid which presents an insignificant amount of drag on the torsional oscillation of the drill string. In practice the drill string is immersed in a heavy drilling mud and will in fact also rub against the sides of the hole it has drilled. The effect of drag or friction is to increase the period of oscillation. Therefore, as noted herein it is desirable to look at a range of frequencies near the calculated frequency.

It has been calculated, in a similar manner to that shown above, that the expected torsional period of oscillation of most drill strings is between 3 and 12 seconds when drilling is occurring at the depths where the present invention finds most utility. In most well drilling at such depths, the drill bit is rotated at speeds in the range of from 50 to 200 revolutions per minute. This means that the period of the rotation of the drill string imposed by the rotary table is in the range from 0.3 to 1.2 seconds. The expected torsional period of the drill string, therefore, is on the order of 10 times as great as the rotational period of the rotary table. Therefore, the expected torsional oscillations are relatively easy to distinguish from oscillations occurring with an undamaged bit. Such background oscillations have the constantly imposed rotational period of the rotary table, or are formed from oscillations that are harmonics of those imposed oscillations.

It is important to note that the relatively low frequency of the characteristic torsional oscillations not only makes them distinguishable from oscillations at the constantly imposed rotational frequency; it also makes the characteristic torsional oscillations not susceptible in the first place to excitation by impulses occurring at repetition rates corresponding to those higher frequencies. As is well known in the physics of vibrations, neither regular nor random impulses tend to excite oscillations of a system whose natural frequency is lower than their average repetition rate. On the other hand, either random or regular impulses tend to excite oscillations in a system whose natural frequency is higher than their average repetition rate (except for certain regular impulse sequences at exactly submultiple frequencies, which tend to cancel their own excitations). So, it is not only possible to distinguish the characteristic torsional oscillations from oscillations at the higher frequencies corresponding to the imposed rotational frequency and its harmonics; it is also reasonable to ascribe those oscillations to impulsive causes at significantly lower repetition rates.

The exact mechanism by which the torsional oscillations used in the present invention are set up is not known; and it would be extremely difficult to investigate. However, the mechanism is believed to be a type of "stick-slip" phenomenon in which the bit, say, with an impaired cone, tends to stick in position, and the lower end of the drill pipe actually stops rotating for a fraction of a second, until the torsional strain induced in the drill pipe builds up such a large forward torque that the sticking is overcome, and the bit rotates impulsively through a relatively large angle. This sends a torsional pulse up the drill pipe which must be reflected at its upper end. Then, if the pulse is strong enough, or if it is followed by a sufficient number of similar pulses, at random intervals, torsional resonance is set up in the drill pipe.

Refer now to FIG. 1 for a detailed description of detection apparatus useful to detect the torsional socillations of interest. In the electrical path from the power source 28 to the motor 24, a shunt 30 is inserted so that the power current or a known fraction of that current may be continuously measured. A signal proportional to the instantaneous current strength is transmitted from shunt 30 to filter 34. This filter is preferably a band pass filter whose upper and lower cutoff frequencies may be varied. Generally then, when the expected period of torsional oscillation of the drill pipe is expected to be between 3 and 12 seconds the upper pass frequency may be set to suppress relatively high frequency signals having a period near the rotary table period and the lower pass frequency may be set to suppress relatively low frequency signals of less than one twenty-fourth cycle per second. In a more specific instance, if the expected perod of torsional oscillation of the drill pipe is expected to be about 8 seconds (a frequency of one-eighth second), the upper pass frequency may be set at, say, 0.25 cycles per second and the lower frequency cutoff at, say, 0.06 cycles per second. The signal passed by the filter 34 is used to activate the strip chart recorder 38, which marks on the chart 39. The stylus 40 of the strip chart recorder produces a record 42 of the current variations which are indicative of the torsional oscillations of drill string 14. If desired, an alarm device such as light 44 and/or bell 43 may be activated by a threshold filter responsive to the signal passed through band pass filter 34.

FIG. 2 represents a typical section of strip chart which was produced utilizing the method of the present invention. In FIG. 2 the oscillatory component of the current for the rotary drive motor is plotted as a function of time. Clock times may be marked on the chart by the recorder itself. Corresponding drilling depths may also sometimes be advantageously entered on the chart. The recorded current represents the variation of the torque on the drill string. The normal torque variation on the drill string is illustrated in the lower portion of the chart below the vicinity of the chart where the time indication is 4:16 P.M. There, a substantially constant torque is being required by, and imposed upon, the drilling apparatus. In the portion of the chart beginning above the 4:30 P.M. marking, relatively large characteristic torsional oscillations begin, indicating that the drill bit is now damaged. These characteristic oscillations are substantially greater in amplitude than the minor oscillations which occurred when drilling with an undamaged bit, i.e., before 4:16 P.M. In the particular strip chart in question each vertical chart division represents 1 recording minute. Thus the period of the oscillations is about 10 seconds. It has also been found that it is sufficient in field practice to record the torque for a 1 minute interval every 15 minutes. Thus as shown in FIG. 2, after one minute of recording between 4:00 P.M. and 4:01 P.M. a fourteen minute break is taken before actuating the torque recorder for another 1 minute interval. As illustrated in FIG. 2 evidently the oscillations began sometime after 4:16 P.M. since characteristic oscillations are shown beginning with the 4:30 P.M. recording. These characteristic oscillations have an amplitude substantially in excess of the minor oscillations occurring before 4:16 P.M. as a result of rotating an undamaged bit in the well.

The proper time to replace a bit is a function of many variables including the hole depth, the formation being drilled, and the probable cost of a complete failure, which would require a subsequent fishing job. The start of oscillations which are recorded in accordance with the method of the present invention, however, informs the driller that the bit is damaged and immediate attention must be given to whatever considerations should precede actual pulling of the pipe. In some instances, the driller will want to pull and replace the bit within two hours after he determines that the oscillations are continuing.

The following Field Examples illustrate the effectiveness of the present invention in indicating bit damage.

As a result of these Examples it was decided that in future operations, in the drilling of similar wells, a bit should be pulled after 2 drilling hours beyond the initial appearance of oscillations in torque.

FIELD EXAMPLE I (BIT PULLED BEFORE FAILURE)

A straight hole was drilled in the South Timbilier Block 86 Field. The hole was 8½ inches in diameter and was being drilled below 9⅝ inch protective pipe set at 14,953 feet. At this depth, roundtrip time averaged 9–10 hours. The rotating roller bits used in this operation had long tooth tungsten carbide inserts. Generally, their life on the bottom is approximately 40 to 60 rotating hours. The practice was to use bit weights of 40 to 45 thousand pounds and a rotary speed of 45 to 50 r.p.m. Due to the long length of protective pipe in this hole, oscillations in torque on the surface were quite apparent as the bit bearings became damaged. After 43 hours of drilling, characteristic oscillations of the type illustrated in FIG. 2 appeared on the torque record. The bit was run 3 more hours in the manner specified above, i.e., with 40 to 45 thousand pounds bit weight and at 45 to 50 r.p.m. rotary speed. The bit was then pulled from the hole and no cones were lost from the bit in the hole. However, the lower bearings from two of the cones were left in the hole and one bit cone was cracked. It is believed that if additional drilling had been done for any extent of time, one or more of the roller cones would have been left in the hole necessitating an undesirable fishing job.

FIELD EXAMPLE II (BIT PULLED AFTER FAILURE)

A hole was being drilled below 16,000 feet. The weight on the bit was 20 thousand pounds and the rotational speed was 87 r.p.m. The hole proceeded from 16,194 feet to 16,280 feet where the weight on the bit was 42 thousand pounds and the rotational speed was 78 r.p.m. At this depth, characteristic oscillation of the rotary torque appeared on the strip chart. Drilling continued for 13 hours during which time the oscillation also continued on the strip chart. At the end of this time the bit was pulled and three cones were left in the hole. An expensive fishing job was required to remove the cones from the hole.

Although only certain preferred embodiments of the present invention have been described in detail, the invention is not meant to be limited to these embodiments only, but rather to the scope of the appended claims.

We claim:

1. The method of determining bit damage in rotary drilling comprising rotating a drill string having a bit attached thereto in a hole and monitoring the rotary torque for characteristic oscillations, said characteristic oscillations having a frequency not more than twice and not less than half the expected frequency of torsional oscillation of the drill string, and said characteristic oscillations having an amplitude substantially in excess of the oscillations produced while rotating an undamaged bit.

2. The method of claim 1 further characterized by activating an alarm signal in response to the occurrence of said characteristic oscillations.

3. The method of determining bit damage in rotary drilling comprising driving an electric motor to rotate a drill string having a bit attached thereto in a hole, producing a signal proportional to the current to the electric motor as indicative of rotary torque, passing said signal through a filter to suppress undesired frequencies more than twice and less than half the expected frequency of torsional oscillation of the drill string to produce an information signal, recording the said information signal passed through said filter and monitoring said information signal for oscillations characteristic of bit damage.

4. The method of claim 3 further characterized in that the expected period of torsional oscillation of the drill string is between 3 and 12 seconds.

5. The method of claim 3 further characterized in that the information signal is recorded on a strip chart.

6. The method of claim 5 further characterized in that the information signal is recorded and monitored only at predetermined sample time intervals.

7. Apparatus for use in well drilling comprising a drill string, drive means for rotating said drill string, torque measuring means connected to said drive means for producing a signal proportional to the torque produced by said drive means, filter means connected to said torque measuring means, said filter means selected to suppress relatively high frequency signals having a period near to the rotary table period and to suppress relatively low frequency signals of less than one twenty-fourth cycle per second and recording means connected to said torque measuring means through said filter means for recording the signal passed by said filter means.

8. Apparatus for use in well drilling comprising a drill string, electric drive means for rotating said drill string, shunt means connected to said electric drive means for producing s signal proportional to the current utilized by said electric drive means, band pass filter means connected to said shunt means, said band pass filter selected to suppress relatively high frequency signals having a period near to the rotary table period and to suppress relatively low frequency signals of less than one twenty-fourth cycle per second, and recording means connected to said shunt means through said band pass filter for recording the signal passed by said band pass filter.

9. The apparatus of claim 8 further characterized in that said recording means includes strip chart means and means for periodically actuating said strip chart means for a limited sample period.

10. The apparatus of claim 8 further characterized in alarm means responsive to actuation by oscillations having a period near the expected period of the drill string and having an amplitude substantially in excess of the amplitude of oscillations produced while rotating an undamaged bit.

*11. Apparatus for use in well drilling with a drill string having a rotary table and drive means for rotating said drill string comprising torque measuring means for producing a signal proportional to the torque produced by drive means rotating a drill string, means for operatively connecting said rotary torque measuring means to a drive means for rotating a drill string, filter means connected to said torque measuring means, said filter means selected to suppress relatively high frequency signals having a period near to the rotary table period and to suppress relatively low frequency signals of less than one twenty-fourth cycle per second and recording means connected to said torque measuring means through said filter means for recording the signal passed by said filter means.*

*12. Apparatus for use in well drilling with a drill string having a rotary table and electric drive means for rotating said drill string comprising shunt means for producing a signal proportional to the current utilized by an electric drive means rotating a drill string through a rotary table, means for operably connecting said shunt means to an electric drive means for rotating a drill string, band pass filter means connected to said shunt means, said band pass filter selected to suppress relatively high frequency signals having a period near to the rotary table period and to suppress relatively low frequency signals of less than one twenty-fourth cycle per second, and recording means connected to said shunt means through said band pass filter for recording the signal passed by said band pass filter.*

*13. The apparatus of claim 12 further characterized in that said recording means includes strip chart means and means for periodically actuating said strip chart means for a limited sample period.*

*14. The apparatus of claim 12 further characterized in including alarm means connected to said band pass filter means and responsive to actuation by oscillations having a period near the expected period of the drill string and having an amplitude substantially in excess of the amplitude of oscillations produced while rotating an undamaged bit.*

*15. Apparatus for determining bit damage in rotary drilling comprising means for rotating a drill string having a bit attached thereto in a hole and means for monitoring the rotary torque for characteristic oscillations, said monitoring means being sensitive only to characteristic oscillations having a frequency not more than twice and not less than half the expected frequency of torsional oscillations of the drill string, and said characteristic oscillations having an amplitude substantially in excess of the oscillations produced while rotating an undamaged bit.*

*16. The apparatus of claim 15 further characterized by an alarm signal means connected to means for monitoring the rotary torque oscillations and operable in response to the occurrence of said characteristic oscillations.*

*17. Apparatus for use in rotary drilling comprising a drill string having a bit attached thereto, an electric motor connected to said drill string, means for driving said electric motor to rotate said drill string having a bit attached thereto in a hole, means for producing a signal proportional to the current of the electric motor as indicative of rotary torque, filter means receiving said signal to suppress undesired frequencies more than twice and less than half the expected frequency of torsional oscillation of the drill string to produce an information signal and recording means for recording the information signal passed through said filter means.*

*18. The apparatus of claim 17 further characterized in that strip chart means records said signal.*

References Cited

The following references, cited by the Examiner, are of record in the patented file of this patent or the original patent.

UNITED STATES PATENTS

| | | | |
|---|---|---|---|
| 3,052,117 | 9/1962 | Miller et al. | 73—136 R |
| 3,417,611 | 12/1968 | Dean et al. | 73—136 R |
| 3,581,564 | 6/1971 | Young, Jr. | 73—151 |

FOREIGN PATENTS

| | | | |
|---|---|---|---|
| 617,065 | 2/1949 | Great Britain | 73—70.1 |

JERRY W. MYRACLE, Primary Examiner

U.S. Cl. X.R.

175—39